July 17, 1962  E. A. DORSETT  3,044,207
ARTIFICIAL FISHING LURE
Original Filed Aug. 13, 1957

EDGAR A DORSETT.
INVENTOR.

BY

Elliott & Pastoriza
ATTORNEYS

3,044,207
ARTIFICIAL FISHING LURE
Edgar A. Dorsett, 150 Hill St., Santa Monica, Calif.
Continuation of application Ser. No. 677,929, Aug. 13, 1957. This application Dec. 8, 1959, Ser. No. 858,192
4 Claims. (Cl. 43—42.31)

This invention relates generally to fishing lures and more particularly to an improved artificial lure for casting in which the action of the lure in the water may be controlled by the fisherman through the medium of the fishing line. This application is a continuation of my application Serial No. 677,929 filed August 13, 1957, now abandoned.

A primary object of this invention is to provide a lure designed to float on water regardless of the angle or position at which the lure first enters the water on casting and yet by control through the fishing line the lure may be made to sink at the will of the fisherman.

Another important object is to provide a controllable fishing lure meeting the foregoing object so designed as to enable movements to be executed for the purpose of both attracting fish and controlling the level at which the lure will float.

Still another object is to provide a fishing lure incorporating noise generating means also performing the function of augmenting pitching movements of the lure started by the fisherman to the end that improved action can be realized.

Briefly these and other objects and advantages of this invention are attained by providing an elongated body having a hollow interior preferably divided into a single upper air tight chamber and relatively larger front and rear chambers. The rear chamber includes a plurality of openings to the exterior of the body so that when the lure is cast into the water, it will fill with water and cause the lure to float with its front end at a higher level than its rear end. The front chamber on the other hand includes only a single opening positoined in the bottom wall portion thereof. The air tight upper chamber serves to stabilize the lure against roll about its longitudinal axis so that it will assume an upright position. Suitable fish hooks are arranged to be secured to the bottom of the body and a fishing line may be secured to the front end.

With the foregoing arrangement, successive pulls on the fishing line after the lure has been cast into the water will result in a relative flow of water along the bottom of the lure. Because of the strategic positioning of the single bottom opening to the front chamber, a reduced pressure area as a consequence of such flow is established adjacent the opening thereby drawing out some of the air in the front chamber. When the tension on the line is reduced, the front chamber will only ship a finite quantity of water to replace the removed air. In addition, the lure can be caused to pitch enabling additional water to be shipped when the front chamber is lower than the rear chamber. Thus, by successively varying the pulling of the line, the fisherman can gradually increase in steps the quantity of water in the front chamber until such time that the front chamber is filled. The lure is designed to sink when both the front and rear chambers are filled but the air tight upper buoyant chamber will still maintain the lure in its upright position so that continued control of the same may be had by the fishing line even though the lure is under water.

An elongated tube with a weight movable therein may also be incorporated in the interior so that the pitching action will be augmented. In addition, a diving vane may be incorporated on the front end of the body to facilitate initial pitching movements upon pulling of the fishing line.

A better understanding of the inventoin will be had by referring to a preferred embodiment thereof as illustrated in the accompanying drawings in which.

Figure 1:
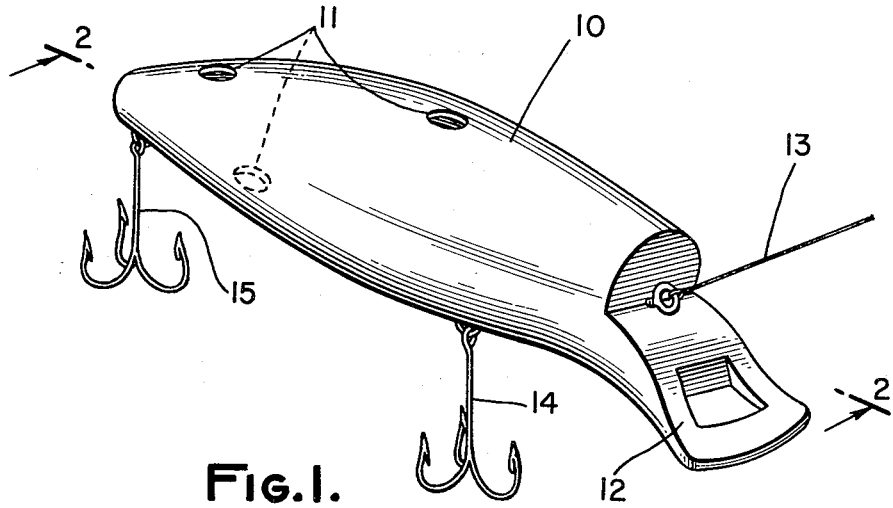
FIGURE 1 is a perspective view of the improved fishing lure of this invention.

Referring first to FIGURE 1, the fishing lure comprises an elongated body 10 including rear openings 11, a front diving vane 12, and suitable means at the front end for securing a fishing line 13 as shown. Fish hooks 14 and 15 are secured to the underside of the lure as shown.

Figure 2:
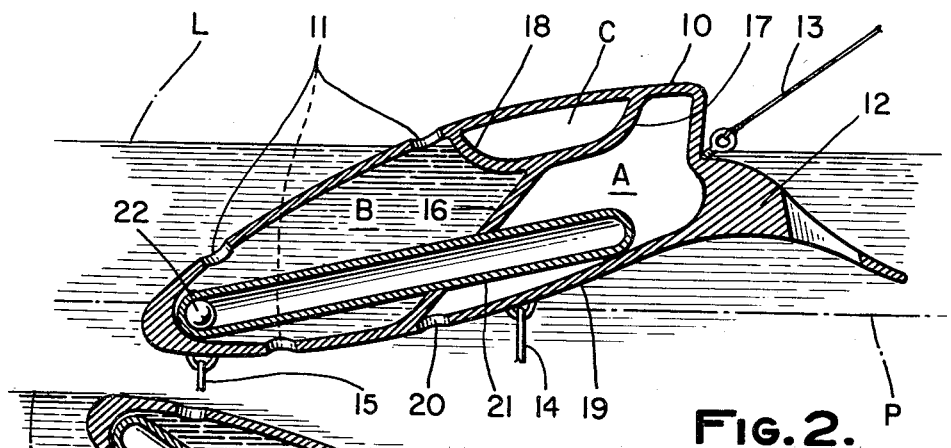
FIGURE 2 is a cross section taken in the direction of the arrows 2—2 of FIGURE 1 showing the lure in the position it will assume when floating on the water after casting.

Referring now to FIGURE 2, it will be noted that the interior of the body 10 is hollow and includes wall means including a wall section 16 and wall portions 17 and 18 at the upper interior of the body. The wall section 16 runs transversely of the longitudinal axis of the body and divides the interior into a front chamber A and a rear chamber B. The upper wall portions 17 and 18 in turn define an upper air tight chamber C. The various openings 11 communicate only with the rear chamber B.

As shown in FIGURE 2, the bottom wall 19 of the front chamber A includes a single opening 20 adjacent to the point where the wall section 16 meets the bottom of the body. The opening 20 is of an area substantially smaller than the cross-sectional area of the chamber A taken in a plane normal to the longitudinal axis of the body. This opening is also flush with the bottom wall 19 as shown.

Also included in the interior of the body 10 is a closed tube 21 extending from the rear chamber B through the wall sectoin 16 to the front chamber A. A small weight in the form of a metal ball 22 is disposed within the closed tube 21 and will be actuated by gravity to move between one end of the tube and the other depending upon the attitude of the lure in the water. In FIGURE 2 for example, the ball is shown at the rear end of the tube while in FIGURE 3, the ball is at the front end.

Figure 3:
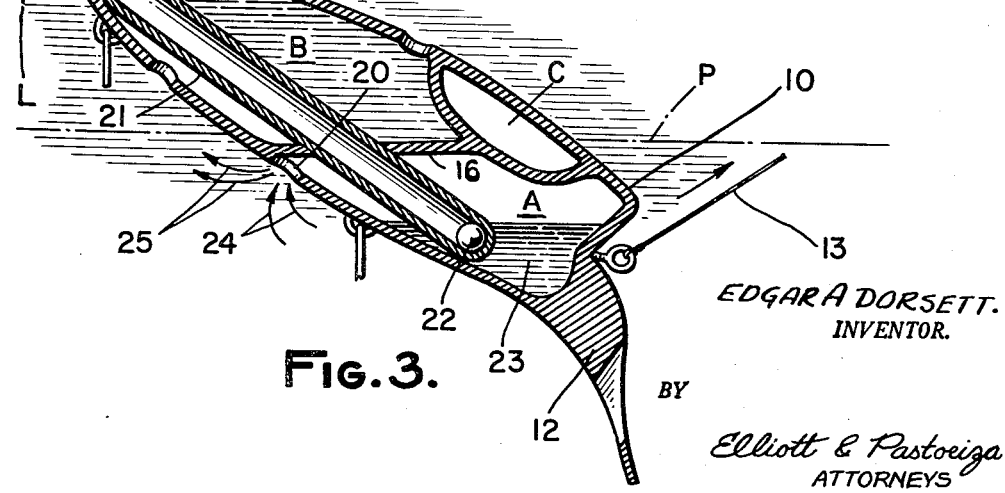
FIGURE 3 is another cross section similar to FIGURE 2 but showing the relative position of the lure with respect to the water in response to controlled forces transmitted through the fishing line by the fisherman.

The operation of the fishing lure can best be understood by referring to FIGURES 2 and 3 together. When the lure is first cast into the water, the rear chamber B will fill with water through one or more of the openings 11 as shown in FIGURE 2. Filling of the rear chamber with water causes the rear chamber to assume a lower level than the front chamber A and thus the lure will float with its front end at a higher level than its rear end with respect to a horizontal plane such as that indicated by the dash dot line P. With the rear end lower than the front end, the metal ball 22 will be in the extreme left position as shown in FIGURE 2. The upper air tight chamber C will insure that the lure remains in an upright position with respect to roll even though the lure may initially be cast into the water in any position. Moreover, because there is only a single opening 20 for the front chamber A substantially no water will enter the chamber A when the lure is in the position shown since the opening 20 is completely submerged in the water and thus the water is excluded by the air pressure within the chamber A. This condition will obtain so long as the lure is at rest and in the upright position illustrated in FIGURE 2. It is this very important positioning function which is accomplished by the air tight chamber C. The equivalent function could be realized, of course, by weighting the bottom of the lure.

The fisherman may pull on the line 13 gently and move the lure about the surface of the water treating the same as a floating object. Stronger pulls on the line 13 resulting in forward motion of the lure will cause a reduced pressure area to develop adjacent the bottom opening 20 by the movement of water in streamlined paths past this opening along the bottom surface. This reduced pressure draws out some of the air in chamber A by the well-known principles of hydro-dynamics and this air is then replaced by water when forward motion of the lure ceases. The front chamber A can thus be gradually filled with water by successive pulls to lower the floating level of the lure and eventually sink the lure.

On the other hand, if it is desired to sink the lure relatively quickly, the fisherman can execute stronger pulls on the fishing line 13. This increased forward force on the lure when the vane 12 is used will result in pitching until the lure, for example, assumes the position shown in FIGURE 3. In this position, the front chamber A, in addition to shipping water as a consequence of fluid flow past the opening 20 is now substantially lower than the rear chamber so that the opening 20 is at a higher level. As a consequence, finite portions of additional water can enter the single opening 20 as indicated by the arrows 24. Air will simultaneously escape as indicated by the arrows 25. Since however the lure will only attain the maximum pitching amplitude shown in FIGURE 3 for a short time because of the relaxation on the line and the buoyancy exhibited by the front chamber A, water will be cut off from entering the chamber A as the lure rotates back to a position approximately that shown in FIGURE 2. The next successive tug on the fishing line 13 will then result in another pitching forward of the lure as a consequence of the diving vane and result in another finite portion of water entering the chamber A. The ball 22 in tube 21 will augment this pitching action by shifting the center of gravity of the lure. It will be evident accordingly that by successively tugging on the line 13 a pitching action of sufficiently large amplitude can be achieved to fill the front chamber A relatively quickly with water.

Since controlled sinking of the lure can be effected without pitching movements but simply by effecting relative action of the water past the single opening 20 as described heretofore, the diving vane and tube and ball are not essential features of the invention. However, by employing the vane to cause the desired pitching motion, in combination with the tube and ball, the ball is caused to move back and forth within the closed tube as desired to provide the desired fish attracting clicking noises as well as augment the pitching action itself.

From the foregoing, it will be evident that the present invention provides a greatly improved fishing lure which constitutes a combination of conventional floating type lures and sinking type lure in that the instant lure can be used as a floating lure until the fisherman desires to sink the lure.

While a preferred embodiment of the invention has been shown and described, various changes and modifications will readily occur to those skilled in the art. The improved fishing lure is therefore not to be thought of as limited to the particular structure set forth merely for illustrative purposes.

What is claimed is:

1. A fishing lure comprising: an elongated body having a hollow interior; wall means defining an air tight chamber in the upper portion of said interior and including a wall section running transversely of the longitudinal axis of said body to divide the remaining portion of said interior into a front chamber and a rear chamber, said front chamber having a single opening to the exterior of said body in its bottom portion adjacent the point said wall section meets the lower portion of said interior and flush with said bottom portion, said rear chamber having a plurality of openings to the exterior of said body; means for securing hooks to the underside of said body; and means for securing a fishing line to the front portion of said body, said body floating in water with its front end higher than its rear end when said rear chamber is filled with water, successive pulls on said line causing water to flow past said single opening to establish a reduced pressure area adjacent said opening whereby portions of water enter said front chamber through said single opening each time said flow is reduced, said air tight chamber buoying up the top portion of said body to hold said lure in an upright position with respect to roll about said longitudinal axis.

2. The subject matter of claim 1, including a diving vane secured to the front of said body and angled downwardly whereby said body is initially caused to pitch forwardly in response to initial pulling on said fishing line to result in a pitching movement when the pull on said line is relaxed, additional portions of water entering said front chamber through said single opening each time said pitching causes said front chamber to assume a position lower than said rear chamber.

3. A fishing lure comprising: an elongated body having a hollow interior defining at least one chamber; means for stabilizing said body against roll about its longitudinal axis so that said lure will float in an upright position; means for securing hooks to said body; and means for securing a line to the front end of said body; said chamber having a single opening in its bottom wall portion of an area substantially less than the cross-sectional area of said chamber taken in a plane normal to said longitudinal axis, said opening being flush with the exterior of said bottom wall portion such that pulling of said line to cause motion of said body in the water results in water flowing in streamlined paths past said opening to draw air from said chamber so that a finite portion of water enters said single opening each time said motion is reduced whereby said lure may be caused to gradually sink to a lower level in said water until said chamber is filled at which time said lure sinks completely.

4. A fishing lure comprising: an elongated body having a hollow interior; wall means defining an air tight chamber in the upper portion of said interior and including a wall section running transversely of the longitudinal axis of said body to divide the remaining portion of said interior into a front chamber and a rear chamber, said front chamber having a single opening to the exterior of said body in its bottom portion adjacent the point said wall section meets the lower portion of said interior, said rear chamber having a plurality of openings to the exterior of said body; means for securing hooks to the underside of said body; means for securing a fishing line to the front portion of said body, said body floating in water with its front end higher than its rear end when said rear chamber is filled with water, successive pulls on said line causing water to flow past said single opening to establish a reduced pressure area adjacent said opening whereby portions of water enter said front chamber through said single opening each time said flow is reduced, said air tight chamber buoying up the top portion of said body to hold said lure in an upright position with respect to roll about said longitudinal axis; a diving vane secured to the front of said body and angled downwardly whereby the body is initially caused to pitch forwardly in response to initial pulling on said fishing line to result in a pitching movement when the pull on said line is relaxed, additional portions of water entering said front chamber through said single opening each time said pitching causes said front chamber to assume a position lower than said rear chamber; an elongated closed tube running longitudinally within said interior from said rear chamber, through said wall section to said front chamber; and a movable weight in said tube whereby said weight moves back and forth along said tube by gravity during said pitching to augment said pitching.

References Cited in the file of this patent

UNITED STATES PATENTS

| | | |
|---|---|---|
| 849,367 | Burke | Apr. 9, 1907 |
| 1,272,003 | Cameron | July 9, 1918 |
| 1,415,653 | Koepke | May 9, 1922 |
| 2,270,487 | Withey | Jan. 20, 1942 |
| 2,793,447 | King | May 28, 1957 |